United States Patent [19]
Lee

[11] Patent Number: 5,369,907
[45] Date of Patent: Dec. 6, 1994

[54] RODENT ELECTROCUTION TRAP

[76] Inventor: Dug G. Lee, 2606 W. 8th St., Los Angeles, Calif. 90057-3810

[21] Appl. No.: 184,938

[22] Filed: Jan. 24, 1994

[51] Int. Cl.⁵ ........................................... A01M 23/38
[52] U.S. Cl. ........................................ 43/98; 43/69; 43/99
[58] Field of Search .................. 43/98, 99, 69, 112

[56] References Cited
FOREIGN PATENT DOCUMENTS
182561 7/1955 Austria .................................. 43/99

Primary Examiner—P. Austin Bradley
Assistant Examiner—Jeanne M. Elpel
Attorney, Agent, or Firm—Erik M. Arnhem

[57] ABSTRACT

A rodent trap operates by electrocuting the animal as it moves to steal the bait from a space above a depressible platform. The platform includes a downwardly swingable plate that is covered by a woven fabric panel. Edge areas of the fabric panel hang downwardly into a water bath located below the platform; water is drawn upwardly by wick action so that the platform fabric surface is wet. As the animal moves along the platform its feet and body become wet due to contact with the wet platform surface. The weight of the animal depresses the platform, which activates a hidden switch, thereby completing an electric circuit which electrocutes the animal while it is on the platform. The wetting of the platform surface facilitates the electrocution process.

7 Claims, 1 Drawing Sheet

RODENT ELECTROCUTION TRAP

BACKGROUND OF THE INVENTION

This invention relates to a rodent trap that utilizes electricity to kill the rodent. The trap is especially design to trap and kill rats and mice.

Various trap devices have been proposed for trapping and killing rats and mice. Some of the proposed devices utilize electricity to kill the trapped animal.

U.S. Pat. No. 2,471,640, issued to L. McFadden on May 31, 1949, discloses a rodent trap that includes a dome-shaped cage having a top access opening for entry of the rodent into the cage interior space. The floor of the cage has a second opening that overlies a fluid container equipped with two vertically-extending electrodes. When the rodent falls through the second opening into the fluid it is electrocuted by current flowing across the water through the fluid body.

One problem with the McFadden device is that the rodent is required to travel a circuitous path (route) in order to be trapped in the fluid. There is some question whether, in actual practice, rodents would take the path described in the patent.

Another problem with the McFadden device is that the electrodes are continually energized. The fluid is subject to electrolytic decomposition due to current flow across the electrodes.

U. S. Pat. No. 1,115,695, issued to S. Leyson on Nov. 3, 1914, shows an electric animal trap that includes two swingable trap doors communicating with an acid bath; a stationary platform is associated with each trap door. Each platform and trap door are connected to an electric current source, so that when a rodent is straddling one of the trap doors and the associated platform an electric circuit is completed through the rodent's body, thereby electrocuting the rodent. The weight of the body causes the trap door to swing down for discharging the body into the acid bath.

One problem with the device shown in the Leyson patent is that the rodent is required to straddle a stationary platform and the associated trap door. If the rodent jumps from the platform onto the trap door the device will not operate.

U.S. Pat. No. 2,218,403 to R. McKee, shows a trap for mice and rats, wherein a trap door is arranged to send a mouse or rat down into a receptacle containing water. Two electrically-charged electrodes have their lower ends extending into the receptacle so that when the mouse or rat enters the water it is electrocuted.

One problem with the device of U. S. Pat. No. 2,218,403 is that the device has a relatively large vertical dimension. The mouse or rat rat has to climb up an inclined ramp in order to reach an area in near proximity to the bait. Also, the rodent is required to advance along a narrow tunnel in order to get to the bait. There is some doubt that a rodent would actually climb the ramp and go through a tunnel in the manner described in the patent.

SUMMARY OF THE INVENTION

The present invention relates to a rodent trap that includes a movable platform member leading to a piece of bait that is exposed to view, such that the rodent is lured toward the bait by its sense of sight, as well as its sense of smell. The visibility of the bait makes it difficult for the rodent to resist the urge to attack the bait.

The movable platform is covered by a fabric panel that has side sections thereof hanging down below the platform into a subjacent water bath. The fabric panel acts as a wick, whereby water is drawn upwardly from the water bath to fully wet the platform surface.

As the rodent moves along the platform its feet become wet and therefore more fully conductive. The weight of the rodent on the platform causes the platform to swing down a sufficient distance to close an electric switch located underneath the platform. Electrodes connected to the switch and to the water bath produce a current flow through the platform and associated wet fabric, whereby the rodent is quickly electrocuted.

The rodent trap, in its preferred form, includes an oil reservoir located alongside the platform which the rodent must use to attack the bait. As the rodent moves along the platform it experiences an electric shock, as noted. The rodent reacts to the electric shock by either falling or jumping from the platform into the oil both, where it is trapped and destroyed.

A principal feature of the invention is the wetted fabric on the movable platform, for ensuring good electrical flow through the animal. The electrocution process is quick and effective. There is no need for the animal to fall through a trap door or traverse a complicated passage system in order to achieve the desired electrocution; the weight of the animal on the movable platform is all that is required for the operation of the trap.

THE DRAWINGS

DESCRIPTION OF A PREFERRED EMBODIMENT OF THE INVENTION

Figure 1:
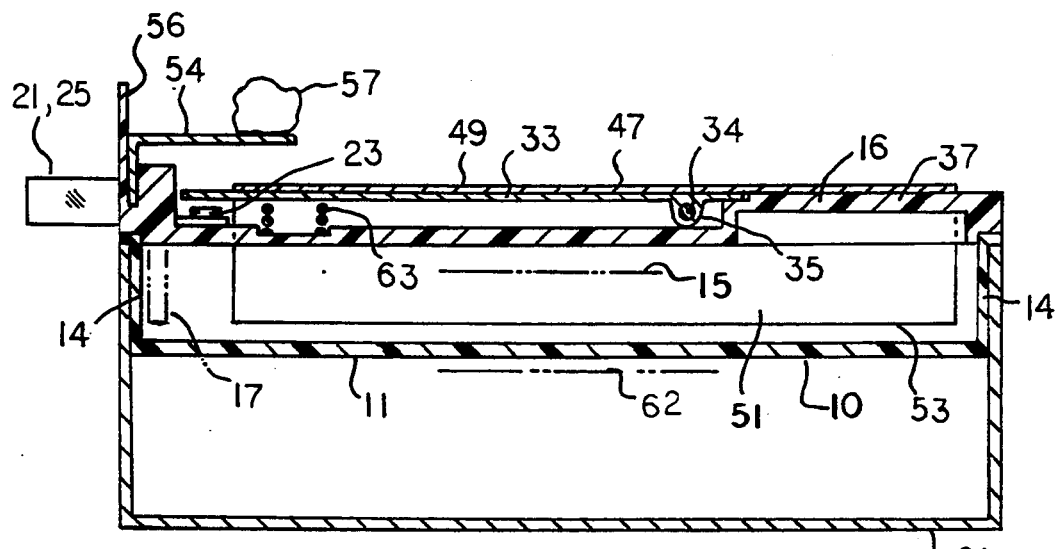
FIG. 1 is a sectional view taken on line 1—1 in FIG. 3, and showing a rodent trap constructed according to the invention.
Figure 3:
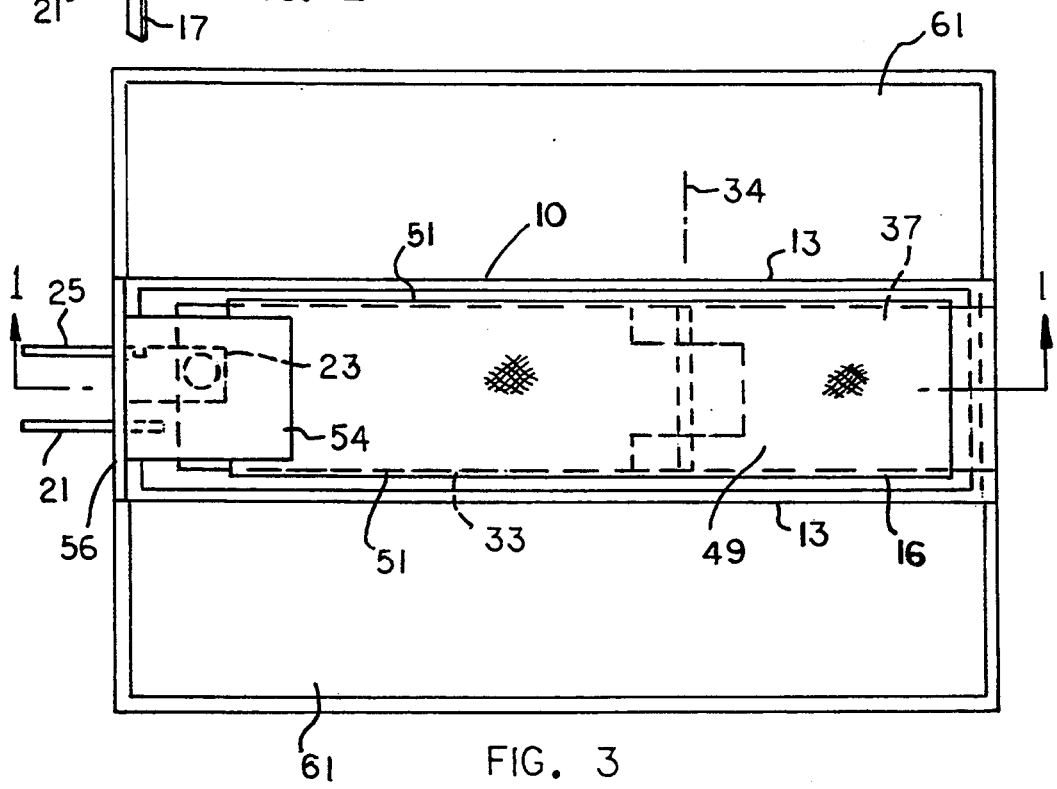
FIG. 3 is a top plan view of the trap shown in FIG. 1.

Referring to FIGS. 1 and 3 of the drawings, there is shown a trap for rodents, particularly rats and mice. The trap comprises an elongated trough-water container 10 removably supported on a larger oil receptacle 61. The container comprises a bottom wall 11, two upstanding end walls 14 and two upstanding side walls 13. Flanges extend from the container end walls to removably support the container on receptacle 61. The container can be removed from the receptacle when necessary.

Figure 2:
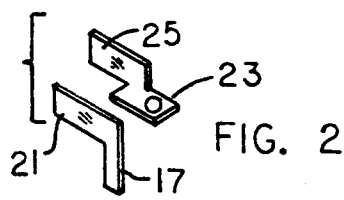
FIG. 2 is a fragmentary perspective view showing two electrical terminals used in the FIG. 1 rodent trap.

The container 10 is partially filled with water to a level designated by numeral 15. The exact amount of water is not critical, as long as the water is sufficient to cover an electrode 17 that extends downwardly into the container from an overhead platform unit 16. Electrode 17 is connected to a spade terminal 21 (FIG. 2).

A second electrode 23 is mounted on platform unit 16 to underlie a movable platform 33. Electrode 23 is connected to a spade terminal 25.

A movable plate or platform 33 is hingedly connected to platform unit 16 so that it can swing downwardly around hinge axis 34 into contact with electrode 23; a coil spring 63 normally holds platform 33 away from electrode 23. Platform 33 is formed of a conductive material so that when platform 33 comes into contact with electrode 23 an electric circuit is completed across members 23 and 33.

Spade terminals 21 and 25 are spaced apart a predetermined distance for operative plug-on connection with the female plug of a conventional extension cord, not shown. The male plug of the extension cord will be plugged into any convenient household outlet, whereby electrical current is made available to the illustrated terminals 21 and 25. Plate 33 is shown in a position spaced from electrode 23, such that the such that the system is in a circuit-open condition.

Platform unit 16 is preferably formed out of a plastic material that encapsulates the electric terminals 21 and 25. Platform unit 16 can be removed from container 10 when it is desired to clean the container. A bracket 54 can be affixed to unit 16 for supporting a piece of bait 57 above the left end of movable platform 33. Wall 56 extends upwardly from platform unit 16 to form a shield against the rodent attacking the bait without stepping on platform 33.

Platform unit 16 has a width dimension that is slightly less than the internal width dimension of container 10 so as to form clearance spaces for accommodating the downwardly-hanging sections of a flexible fabric panel 47. Fabric panel 47 comprises a central section 49 covering the upper surfaces of platform unit 16 and movable platform 33, and two side sections 51 hanging downwardly from central section 49. The clearance spaces at the side edges of the platform unit accommodate the downwardly-hanging sections of the frabric panel.

The lower edges of the downwardly hanging fabric are indicated by numeral 53 in FIG. 1. The fabric panel is formed of a woven material that is wettable and water-absorbent, whereby the fabric acts as a wick. Water is carried or transported by capillary action from the water bath upwardly along hanging sections 51 of the fabric panel, so that central section 49 of the fabric panel is in a wet condition.

Bait 57 is located remote from hinge 35, such that the rodent is required to move from the stationary platform section 37 onto movable section 33 in order to reach the bait. The rodent ordinarily would move in a right-to-left direction when going after the bait.

Container 10 is supported on a larger oil receptacle 61 that is wider than container 10, such that receptacle areas alongside the platform form two oil traps. Receptacle 61 is filled with a viscous oil to a level designated by numeral 62, such that the rodent would ordinarily avoid the receptacle when seeking a path to the bait. The trap is designed so that the rodent can easily see the bait and be caused to approach it from the right end of platform unit 16.

As the mouse or rat moves over platform unit 16 its feet become wet due to contact with wet fabric panel 47, thereby making the animal more conductive. As the animal steps onto movable platform 33 its weight presses the plate 33 down against the biasing force of spring 63. Spring 63 exerts enough force to balance the weight of plate 33, but not enough force to support the weight of the plate and the animal.

Plate 33 swings down around hinge axis 34 so as to contact electrode 23, thereby completing an electric circuit for electrocuting the animal.

The electric circuit that produces the electrocution comprises electrode 17, the water bath, the water film on fabric panel 47, metal plate 33 and electrode 23.

The electrocuted animal may come to rest on the platform. Alternately the electrocuted animal may fall or drop into the viscous oil in receptacle 61. In either event the animal will be killed. The electrocution action is facilitated by the fact that the animal's feet are in contact with a wet fabric surface when its weight closes the electric circuit.

Advantageously the movement of plate 33 for closing the electric circuit is relatively small, less than one quarter inch at the left end of the plate. The small actuation movement is advantageous in that the animal does not have a very long time to react to the initial plate motion. The animal is unaware of any plate motion until the switch action is near completion.

The oil-filled receptacle serves to initially direct the rodent toward the right end of the platform unit 16. Also, the oil-filled receptacle serves as auxiliary trap device to trap the animal should the electrocution action, for any reason, not be fully effective.

The invention is concerned primarily with the construction of container 10 and the wetted platform, whereby the animal is electrocuted by the action of its own weight on the movable platform 33. An important feature of the invention is the fabric panel 47, arranged so that at least one side section of the panel hangs downwardly into the water bath. The drawings show fabric panel 47 as having two downwardly hanging sections 51. However, the panel could be formed with only one downwardly hanging edge section.

What is claimed is:

1. An electrocution trap for rodents, comprising
  a water container having a bottom wall, side walls, and an open upper mouth;
  a platform means extending across the open upper mouth of said container; said platform means comprising a stationary platform member, and a downwardly swingable platform member;
  a fabric panel supported on said platform means; said fabric panel comprising a first fabric section covering said platform means, and a second fabric section extending downwardly into the water in said container; said first fabric section forming
  a walking surface for rodents moving along said platform means;
  a first electrode means extending into said container for supplying current to the water in said container; and
  a second electrode means extending above said container in the path of said downwardly swingable platform member;
  said fabric panel constituting a wick, so that said first fabric section is in a wet condition whereby when a rodent moves from the stationary platform member onto the downwardly swingable platform member the weight of the rodent causes the swingable platform member to complete an electric circuit through said second electrode means, whereupon the rodent is electrocuted by reason of its contact with said first fabric section.

2. The electrocution trap of claim 1, and further comprising a bait support means located above said swingable platform member remote from said stationary platform member, whereby the rodent has access to the bait only after it has moved onto the downwardly swingable platform member.

3. The electrocution trap of claim 1, and further comprising an oil receptacle means underlying said container; said oil receptacle means having a greater plan area than the container so as to provide viscous oil rodent trappage areas alongside the platform means.

4. The electrocution trap of claim 3, wherein said container is removably supported on said oil receptacle means.

5. The electrocution trap of claim 1, and further comprising a spring means operable to balance the weight of the downwardly swingable platform member, whereby said downwardly swingable platform member is normally out of contact with said second electrode means.

6. The electrocution trap of claim 1, wherein each electrode means comprises a spade terminal; said spade terminals being spaced apart to accommodate a female plug on an electric extension cord.

7. The electrocution trap of claim 1, wherein said downwardly swingable platform has a free end arranged to travel downwardly only about one quarter inch before making contact with said second electrode means.

* * * * *